United States Patent
Shimizu (10) Patent No.: US 7,104,921 B2
(45) Date of Patent: Sep. 12, 2006

(54) VEHICLE DRIVE APPARATUS

(75) Inventor: Kouichi Shimizu, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 162 days.

(21) Appl. No.: 10/940,706

(22) Filed: Sep. 15, 2004

(65) Prior Publication Data
US 2005/0070401 A1    Mar. 31, 2005

(30) Foreign Application Priority Data
Sep. 29, 2003 (JP) .............................. 2003-337881
Sep. 9, 2004 (JP) .............................. 2004-262461

(51) Int. Cl.
*B60W 10/02* (2006.01)
(52) U.S. Cl. ........................................................ 477/5
(58) Field of Classification Search ................... 475/5; 180/65.2–65.6; 477/5
See application file for complete search history.

(56) References Cited

U.S. PATENT DOCUMENTS

| 4,533,011 A | 8/1985 | Heidemeyer et al. |
| 5,253,724 A | 10/1993 | Prior |
| 5,627,438 A | 5/1997 | Barrett |
| 5,934,397 A | 8/1999 | Schaper |
| 6,024,182 A * | 2/2000 | Hamada et al. ............ 180/6.28 |
| 6,321,865 B1 * | 11/2001 | Kuribayashi et al. ....... 180/243 |

FOREIGN PATENT DOCUMENTS

| DE | 2353724 | 5/1974 |
| EP | 0930193 A2 | 7/1999 |
| EP | 1400386 A2 | 3/2004 |
| JP | 55-138129 U | 10/1980 |
| WO | WO-91/08919 A1 | 6/1991 |

* cited by examiner

*Primary Examiner*—Dirk Wright
(74) *Attorney, Agent, or Firm*—Global IP Counselors (57) ABSTRACT

A vehicle drive apparatus is provided that comprises first and second drive sources, a main clutch, a subordinate clutch, a drive source selecting section, and a clutch control section. The first and second drive sources output drive forces to a first wheel. The main clutch is configured to simultaneously shut off delivery of outputs from the first and second drive sources. The subordinate clutch coupled to the first drive source is configured to shut off delivery of only the output from the first drive source. The drive source selecting section is configured to select at least one of the first and second drive sources to output the drive force. The clutch control section is configured to release the subordinate clutch while the main clutch is temporality released upon a determination of the first drive source being switched from an output delivery state to an output stop state.

18 Claims, 9 Drawing Sheets

VEHICLE DRIVE APPARATUS

BACKGROUND OF THE INVENTION

1. Field of the Invention

The present invention generally relates to a vehicle drive apparatus. More specifically, the present invention relates to a vehicle drive apparatus configured and arranged such that a wheel or wheels can be driven with a plurality of drive sources.

2. Background Information

One example of a conventional vehicle drive apparatus configured such that the front and rear wheels can be driven with a plurality of drive sources is disclosed in Japanese Laid-Open Utility Model Publication No. 55-138129. This reference discloses a four-wheel drive vehicle in which one of a pair of front wheels or a pair of rear wheels is driven with an engine and the other pair of wheels that is not driven with the engine is driven with a motor.

In view of the above, it will be apparent to those skilled in the art from this disclosure that there exists a need for an improved vehicle drive apparatus. This invention addresses this need in the art as well as other needs, which will become apparent to those skilled in the art from this disclosure.

SUMMARY OF THE INVENTION

It has been discovered that, when the motor-driven wheels that are not driven by the engine are driven with a single electric motor as disclosed in the conventional vehicle drive apparatus in the above mentioned reference, the electric motor is required to have a large output capacity in order to provide both high torque at low rotational speeds and sufficient torque at medium to high rotational speeds. One feasible method of increasing the output of the electric motor is to increase the number of coil windings and raise the magnetic flux of the motor. However, increasing the number of coil windings causes the size of the motor to become large.

In view of the above problem, one object of the present invention is to provide a vehicle drive apparatus that is capable of driving a wheel or wheels with a plurality of drive sources to prevent the size of a single drive source from becoming large and capable of sufficiently accommodating rotational speeds ranging from low speeds to high speeds.

In order to achieve the aforementioned object, a vehicle drive apparatus is provided that comprises first and second drive sources, a main clutch, a subordinate clutch, a drive source selecting section, and a clutch control section. The first and second drive sources are configured and arranged to output drive forces to at least a first wheel of a vehicle. The main clutch is configured and arranged to simultaneously shut off delivery of outputs from the first and second drive sources to the first wheel. The subordinate clutch is coupled to the first drive source configured and arranged to shut off delivery of only the output from the first drive source to the first wheel. The drive source selecting section is configured and arranged to select at least one of the first and second drive sources to output the drive force to the first wheel. The clutch control section is configured and arranged to release the subordinate clutch while the main clutch is temporarily released upon a determination of the first drive source being switched from an output delivery state to an output stop state These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
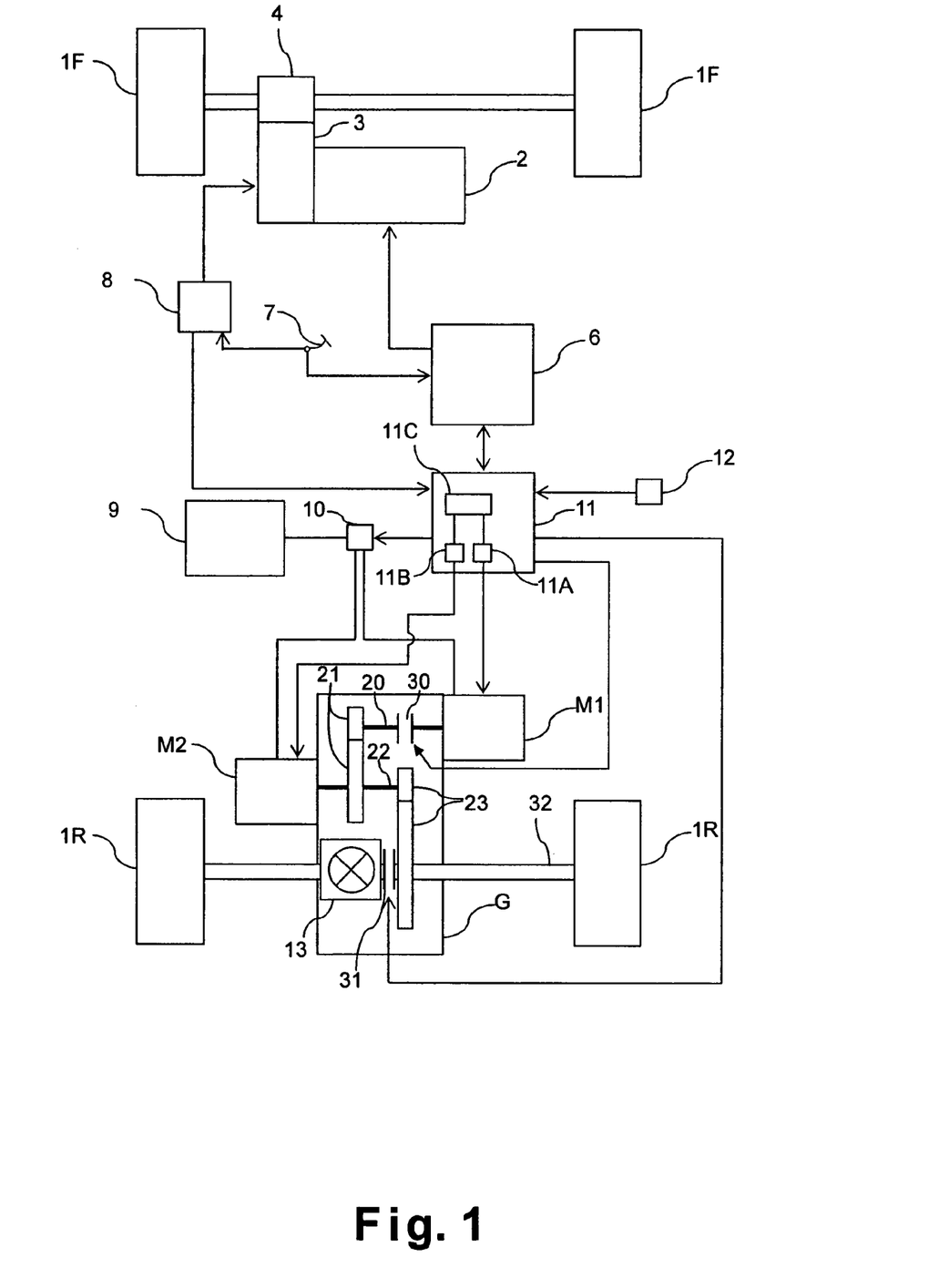
FIG. 1 is a schematic block diagram of a vehicle equipped with a vehicle drive apparatus in accordance with a first embodiment of the present invention.

FIG. 1 is a schematic block diagram illustrating a vehicle equipped with a vehicle drive apparatus in accordance with the first embodiment. In the first embodiment, the vehicle drive apparatus is applied to a four-wheel drive vehicle in which a pair of left and right front wheels 1F is driven by a power train such as an engine 2 and a pair of left and right rear wheels 1R is driven by two electric motors, first and second motors M1 and M2. The output of the engine 2 is delivered to the left and right front wheels 1F through a transmission 3 and a front wheel differential gear 4. The outputs of the first and second motors M1 and M2 (for example, disposed left and right, respectively) are preferably delivered to the left and right rear wheels 1R through a reduction gear G and a rear wheel differential gear 13.

The output of the engine 2 is controlled by adjusting a throttle valve and other components based on commands from an engine controller 6. The engine controller 6 is configured to compute the amount by which the output of the engine 2 will be adjusted based on such factors as the vehicle speed and the amount by which an accelerator pedal 7 is depressed.

The transmission 3 is preferably an automatic transmission such as a conventional shifting type automatic transmission configured and arranged to change gears (i.e., shift) in accordance with a shift command issued from a transmission controller 8.

The first and second motors M1 and M2 are preferably configured and arranged to use a battery 9 as a power source. The operations of the first and second motors M1 and M2 are preferably controlled by a motor controller 11. More specifically, the field currents of the first and second motors M1 and M2 are adjusted in accordance with commands issued from the motor controller 11 to generate the outputs. Then, as explained above, the output generated by the first and second electric motors M1 and M2 are preferably delivered to the rear wheels 1R through the reduction gear G.

The motor controller 11 preferably includes a microcomputer with a control program that controls the first and second motors M1 and M2 as discussed below. The motor controller 11 can also include other conventional components such as an input interface circuit, an output interface circuit, and storage devices such as a ROM (Read Only Memory) device and a RAM (Random Access Memory) device. The microcomputer of the motor controller 11 is programmed to control the first and second motors M1 and M2. The memory circuit stores processing results and control programs that are run by the processor circuit. The motor controller 11 is operatively coupled to the first and second motors M1 and M2 and other components of the vehicle drive apparatus in a conventional manner. The internal RAM of the motor controller 11 stores statuses of operational flags and various control data. The motor controller 11 is capable of selectively controlling any of the components of the control system in accordance with the control program. It will be apparent to those skilled in the art from this disclosure that the precise structure and algorithms for the motor controller 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The outputs generated by the first and second motors M1 and M2 are delivered to the rear wheels 1R through the reduction gear G that is coupled to a wheel axle 32 of the rear wheels 1R.

As seen in FIG. 1, the reduction gear G preferably has a first shaft 20 coupled to an output shaft of the first motor M1 and a second intermediate shaft 22 coupled to an output shaft of the second motor M2. The reduction gear G is configured and arranged such that the rotation of the first shaft 20 is reduced in two stages (i.e., with two gear trains) before the rotation of the first shaft 20 is transferred to the wheel axle 32 of the rear wheels 1R. More specifically, the rotation of the first shaft 20 is preferably first reduced by a first gear reduction arrangement including a pair of first reduction gears 21 at a reduction ratio R1 (e.g., R1=6) and transferred to the second shaft 22. Then, the rotation of the second shaft 22 is preferably reduced by a second gear reduction arrangement including a pair of second reduction gears 23 at a reduction ratio R2 (e.g., R2=6) and transferred to the wheel axle 32. Therefore, the output of the first motor M1 is delivered to the wheel axle 32 at a reduction ratio suitable for low speed travel (in this example, R1×R2=36), while the output of the electric motor M2 is delivered to the wheel axle 32 at a reduction ratio suitable for high speed travel (in this example, R2=6).

In the first embodiment of the present invention, the first and second motors M1 and M2 preferably have identical specifications (i.e., have the same torque characteristic). Of course, it will be apparent to those skilled in the art from this disclosure that the first and second motors M1 and M2 can be arranged to have different torque characteristics. In any event, the vehicle drive apparatus of the present invention is preferably configured and arranged to utilize the first motor M1 that provides low rotational speed torque specifications that outputs torque more readily at low rotational speeds (i.e., the peak torque value of the motor occurs at a low rotational speed) and the second motor M2 that provides high rotational speed torque specifications that outputs torque more readily at high rotational speeds (i.e., the peak torque value of the motor occurs at a high rotational speed).

The vehicle drive apparatus of the first embodiment of the present invention is further provided with a subordinate clutch 30 and a main clutch 31. As seen in FIG. 1, the subordinate clutch 30 is installed between the first motor M1 and the first shaft 20 (first torque delivery path). Thus, the subordinate clutch 30 is configured and arranged such that the output of the first motor M1 can be delivered to or shut off from (not delivered to) the rear wheels 1R by operating the subordinate clutch 30. The subordinate clutch 30 is preferably, but not limited to, a dog clutch. The subordinate clutch 30 is engaged and disengaged (released) based on the commands issued from the motor controller 11.

As seen in FIG. 1, the main clutch 31 is installed between the reduction gear G and the rear wheel differential 13 (second torque delivery path) such that the outputs of both the first and second motors M1 and M2 can be shut off from the rear wheels 1R by operating the main clutch 31. The main clutch 31 is engaged and disengaged (released) based on the commands issued from the motor controller 11.

With the vehicle drive apparatus of the first embodiment, the subordinate clutch 30 is released while the main clutch 31 is temporarily released i.e., when the vehicle drive apparatus is in a state in which the outputs from both of the first and second motors M1 and M2 are shut off from the rear wheels 1R. As a result, the subordinate clutch 30 is reliably released even when the vehicle is moving. Thus, a passive rotation of the first motor M1 caused by the rotation of the second shaft 22, after the drive input to the first motor M1 is stopped, can be prevented.

In the first embodiment, a drive mode switch 12 is preferably provided to the vehicle to switch between a two-wheel drive mode and a four-wheel drive mode. A start command is sent to the motor controller 11 when the drive mode switch 12 is set to the four-wheel drive position and a stop command is sent to the motor controller 11 when the drive mode switch 12 is set to the two-wheel drive position. When the start command is sent to the motor controller 11, the motor controller 11 is configured to control the first motor M1 and/or the second motor M2 to drive the rear wheels 1R, thereby achieving the four-wheel drive state. When the stop command is sent to the motor controller 11, the motor controller 11 is configured to terminate the driving of the first and second motors M1 and M2, and thus, the vehicle is driven only by the front wheels 1F coupled to the engine 2.

The motor controller 11 is preferably provided with a first motor control unit 11A, a second motor control unit 11B, and a motor control main unit 11C. The first motor control unit 11A is configured and arranged to supply drive input to the first motor M1 upon receiving an ON command from the motor control main unit 11C and terminate the drive input to the first motor M1 upon receiving an OFF command. Similarly, the second motor control unit 11B is configured and arranged to supply drive input to the second motor M2 upon receiving an ON command from the motor control main unit 11C and terminate the drive input to the second motor M2 upon receiving an OFF command.

More specifically, the first and second motor control units 11A and 11B are configured and arranged to control driving of the first and second motors M1 and M2, respectively, by connecting the power from the battery 9 to the first and second motors M1 and M2, and adjusting the field current of the first and second motors M1 and M2 to achieve a targeted rotational speed or output torque of the first and second motors M1 and M2. As shown in FIG. 1, a power distribution control unit 10 is provided to adjust the electric power delivered from the battery 9 to the first and second motors M1 and M2.

The vehicle drive apparatus in accordance with the first embodiment is preferably configured and arranged to select one of the drive sources (i.e., the first motor M1 or the second motor M2) based on whether a current vehicle speed Vw is larger than a prescribed changeover vehicle speed Vc. More specifically, the vehicle drive apparatus of the first embodiment is preferably configured and arranged to control the first and second motors M1 and M2 such that the output of the first motor M1 is delivered to the rear wheels 1R when the vehicle speed Vw is equal to or less than the prescribed changeover vehicle speed Vc and the output of the second motor M2 is delivered to the rear wheels 1R when the vehicle speed Vw is larger than the prescribed changeover vehicle speed Vc.

Figure 2:
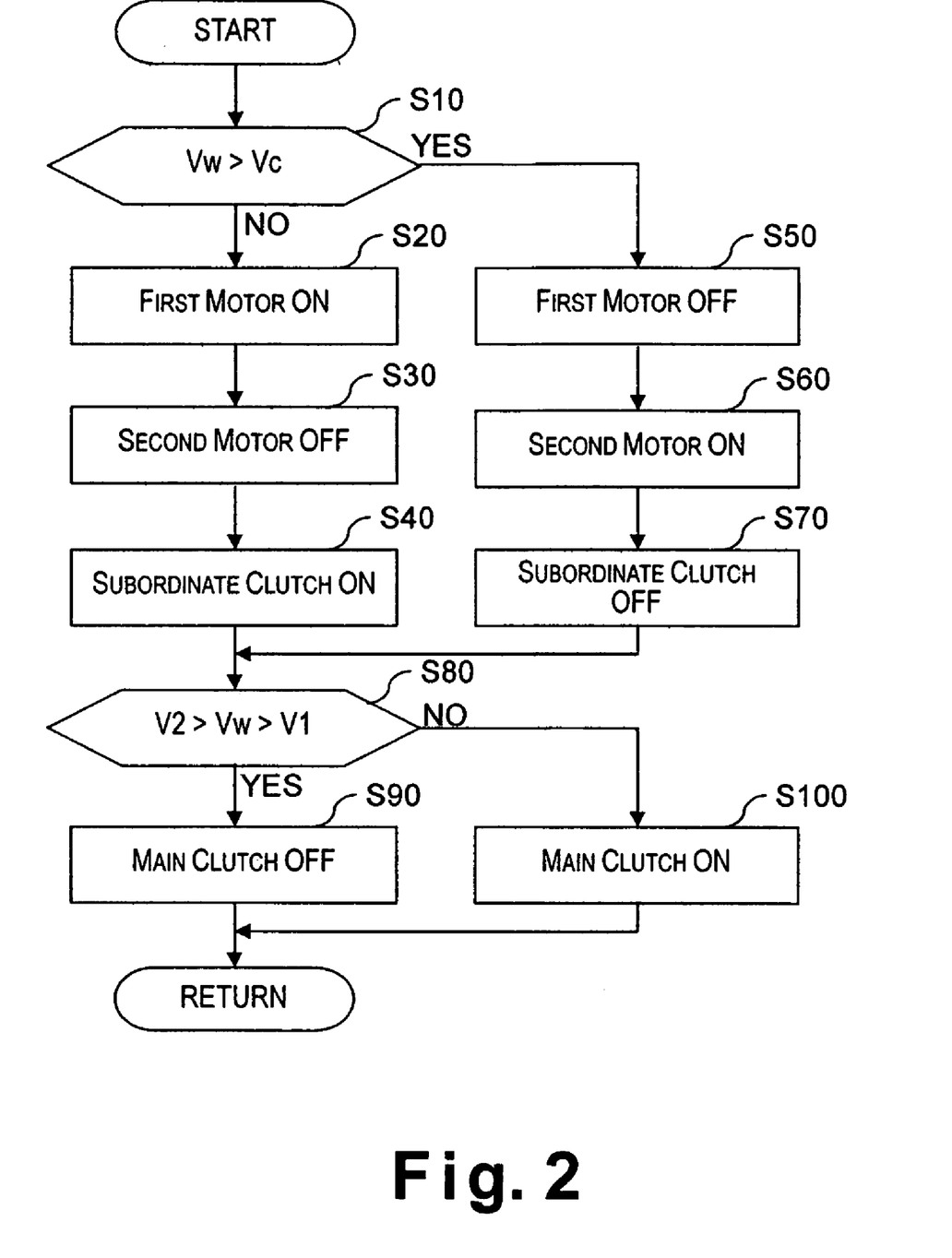
FIG. 2 is a flowchart for explaining a control processing executed by a motor controller of the vehicle drive apparatus in accordance with the first embodiment of the present invention.

The control processing executed by the motor control main unit 11C upon receiving the start command from the drive mode switch 12 is now described with reference to the flowchart of FIG. 2. The motor control main unit 11C is also configured to send an ON command to the main clutch 31 upon receiving the start command from the drive mode switch 12. The control processing shown in FIG. 2 is executed repeatedly according to a prescribed sampling time until the motor control main unit 11C receives the stop command from the drive mode switch 12. Upon receiving the stop command, the motor control main unit 11C is configured to send OFF commands to the first and second motor control units 11A and 11B and the main clutch 31. Accordingly, in the first embodiment, the motor control main unit 11C preferably constitutes a drive source selecting section and a clutch control section.

As seen in FIG. 2, in step S10, the motor control main unit 11C is configured to determine if the current vehicle speed Vw exceeds a prescribed changeover speed Vc. If the vehicle speed Vw is equal to or less than the prescribed changeover vehicle speed Vc, then the motor control main unit 11C is configured to proceed to step S20. If the vehicle speed Vw exceeds the prescribed changeover vehicle speed Vc, then the motor control main unit 11C is configured to proceed to step S50. Alternatively, the motor control main unit 11C can also be configured to compare a rotational speed of the rear wheels 1R to a prescribed rotational speed in step S10 instead of using the current vehicle speed Vw.

The prescribed changeover vehicle speed Vc is preferably set based on the torque characteristics of the first motor M1 and/or the second motor M2 and the reduction ratios of the reduction gear G. More specifically, the prescribed changeover vehicle speed Vc is preferably set to, for example, a vehicle speed (a speed obtained by multiplying the motor rotational speed by reduction ratio) corresponding to a rotational speed at which the torque characteristic of the first motor M1 declines (e.g., 20 km/hour). Of course, it will be apparent to those skilled in the art from this disclosure that the precise value of the prescribed changeover vehicle speed Vc varies depending on the torque characteristic of the first motor M1, the reduction gear ratio, and various other conditions.

In step S20, the motor control main unit 11C is configured to send the ON command to the first motor control unit 11A. Then, in step S30, the motor control main unit 11C is configured to send the OFF command to the second motor control unit 11B and proceed to step S40. Thus, in the first embodiment of the present invention, the first motor M1 is turned on and the second motor M2 is turned off when the vehicle speed Vw is smaller than the prescribed changeover vehicle speed Vc.

In step S40, the motor control main unit 11C is configured to send the ON command to the subordinate clutch 30 and proceed to step S80.

On the other hand, if the vehicle speed Vw was determined to be larger than the prescribed changeover vehicle speed Vc in step S110, then the motor control main unit 11C is configured to send the OFF command to the first motor control unit 11A in step S50. Then, in step S60, the motor control main unit 11C is configured to send the ON command to the second motor control unit 11B and proceed to step S70. Thus, in the first embodiment of the present invention, the first motor M1 is turned off and the second motor M2 is turned on when the vehicle speed Vw is larger than the prescribed changeover vehicle speed Vc.

In step S70 the motor control main unit 11C is configured to send the OFF command to the subordinate clutch 30 and proceed to step S80.

In step S80, the motor control main unit 1C is configured to determine if the vehicle speed Vw is greater than a first prescribed vehicle speed V1 and less than a second prescribed vehicle speed V2, i.e., if the vehicle speed Vw falls between the first prescribed vehicle speed V1 and the second prescribed vehicle speed V2. The first prescribed vehicle speed V1 and the second prescribed vehicle speed V2 are set to satisfy the relationship V2 >Vc>V1. For example, the first prescribed vehicle speed V1 and the second prescribed vehicle speed V2 are preferably set to 17 km/hour and 23 km/hour, respectively, when the prescribed changeover vehicle speed Vc is set to approximately 20 km/hour.

If the vehicle speed Vw is between the first prescribed vehicle speed V1 and the second prescribed vehicle speed V2 in step S80, then the motor control main unit 11C is configured to proceed to step S90 and send the OFF command to the main clutch 31 before ending the control sequence.

If the vehicle speed Vw is not between the first prescribed vehicle speed V1 and the second prescribed vehicle speed V2 in step S80, then the motor control main unit 11C is configured to proceed to step S100 and send the ON command to the main clutch 31 before ending the control sequence.

Figure 3:
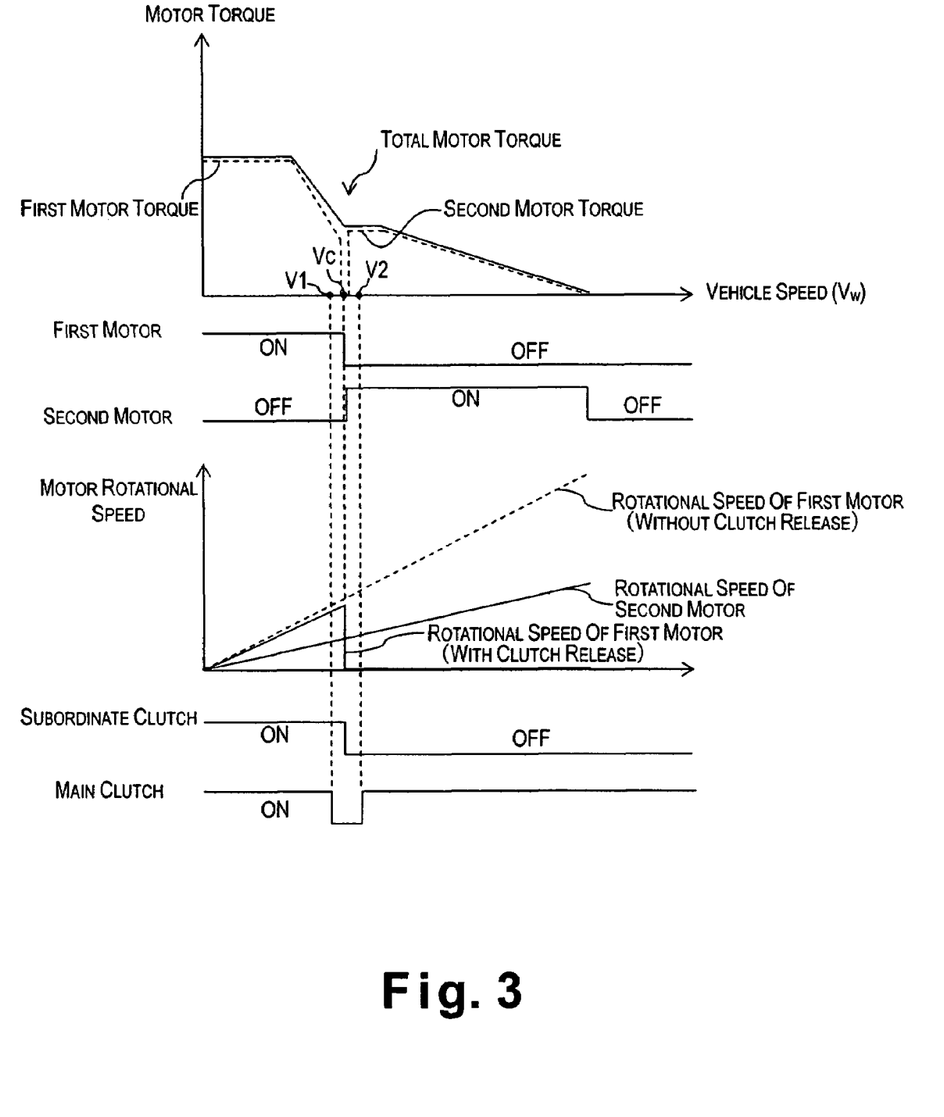
FIG. 3 is an example of a time chart for illustrating relationships between operations of the first motor, the second motor, the subordinate clutch and the main clutch and the motor torque and the motor rotational speed in accordance with the first embodiment of the present invention.

The operation and effects of the first embodiment of the present invention will now be described with reference to FIG. 3. In the following explanation, the vehicle is assumed to be operating in the four-wheel drive mode (i.e., the drive mode switch 12 is set to the four-wheel drive position).

In the first embodiment, when the vehicle is starting to move from a stopped condition or the vehicle is traveling at a speed equal to or below the prescribed changeover vehicle speed Vc, the vehicle drive apparatus is configured to drive the first motor M1 for low rotational speed. In other words, when the vehicle is starting to move from a stop position or the vehicle speed Vw is smaller than the prescribed changeover vehicle speed Vc, the vehicle requires a large torque. Thus, as seen in FIG. 1, the large torque (first motor torque) can be delivered to the rear wheels 1R by driving (supplying drive input to) the first motor M1. Accordingly, powerful acceleration can be achieved when, for example, the vehicle is starting to move from a stopped condition.

On the other hand, when the vehicle speed Vw exceeds the prescribed changeover vehicle speed Vc, the required torque is relatively small. Therefore, the first motor M1 is stopped and the rear wheels 1R are driven with the second motor M2. As explained above, the reduction ratio for the first motor M1 is set for low speed condition and the reduction ratio for the second motor M2 is set for the high speed condition.

As a result, the use of the two motors, i.e., the first and second motors M1 and M2, is divided appropriately based on whether low speed operation (e.g., when the vehicle is starting from a stop or the vehicle speed Vw is smaller than the prescribed changeover vehicle speed Vc) or high speed operation is required. Since the burden imposed on the first and second motors M1 and M2 is dispersed progressively depending on the vehicle speed, a situation in which one of the first and second motors M1 and M2 wears out faster than the other can be prevented.

Moreover, in the first embodiment of the present invention, the vehicle drive apparatus is configured and arranged to release the clutch 30 when the vehicle is traveling at a high speed (i.e., the vehicle speed Vw is higher than the prescribed changeover vehicle speed Vc). Thus, the first motor M1, which is connected to the wheel axle 32 with a high reduction ratio suited to low speed travel, is prevented from rotating at an excessive rotational speed when the vehicle is traveling at a high speed as seen in FIG. 3 (shown with a broken line labeled as "rotational speed of first motor (without clutch release)"). However, the subordinate clutch 30 comprising a dog clutch may not be released when the vehicle is traveling at a high speed because a torque equal to or greater than a prescribed torque is being transmitted to the first shaft 20. Therefore, in the first embodiment of the present invention, the main clutch 31 is released temporarily before the subordinate clutch 30 is released, thereby reducing the torque imparted to the first shaft 20 to a smaller torque. As a result, the subordinate clutch 30 can be released reliably.

Although a dog clutch is preferably used as the subordinate clutch 30 in the above explanation, the subordinate clutch 30 is not limited to a dog clutch. For example, a friction clutch can be used as the subordinate clutch 30 in the present invention. When a friction clutch is used as the subordinate clutch 30, there may be cases in which the torque of the first shaft 20 would cause shock and abnormal noise to occur if the subordinate clutch 30 is released without the main clutch 31 is released. However, in the first embodiment, the main clutch 31 is preferably released temporarily before the subordinate clutch 30 is released, thereby reducing the torque imparted to the first shaft 20 to a smaller torque. As a result, the occurrence of shock and abnormal noise can be suppressed when the friction clutch is used as the subordinate clutch 30.

Figure 4:
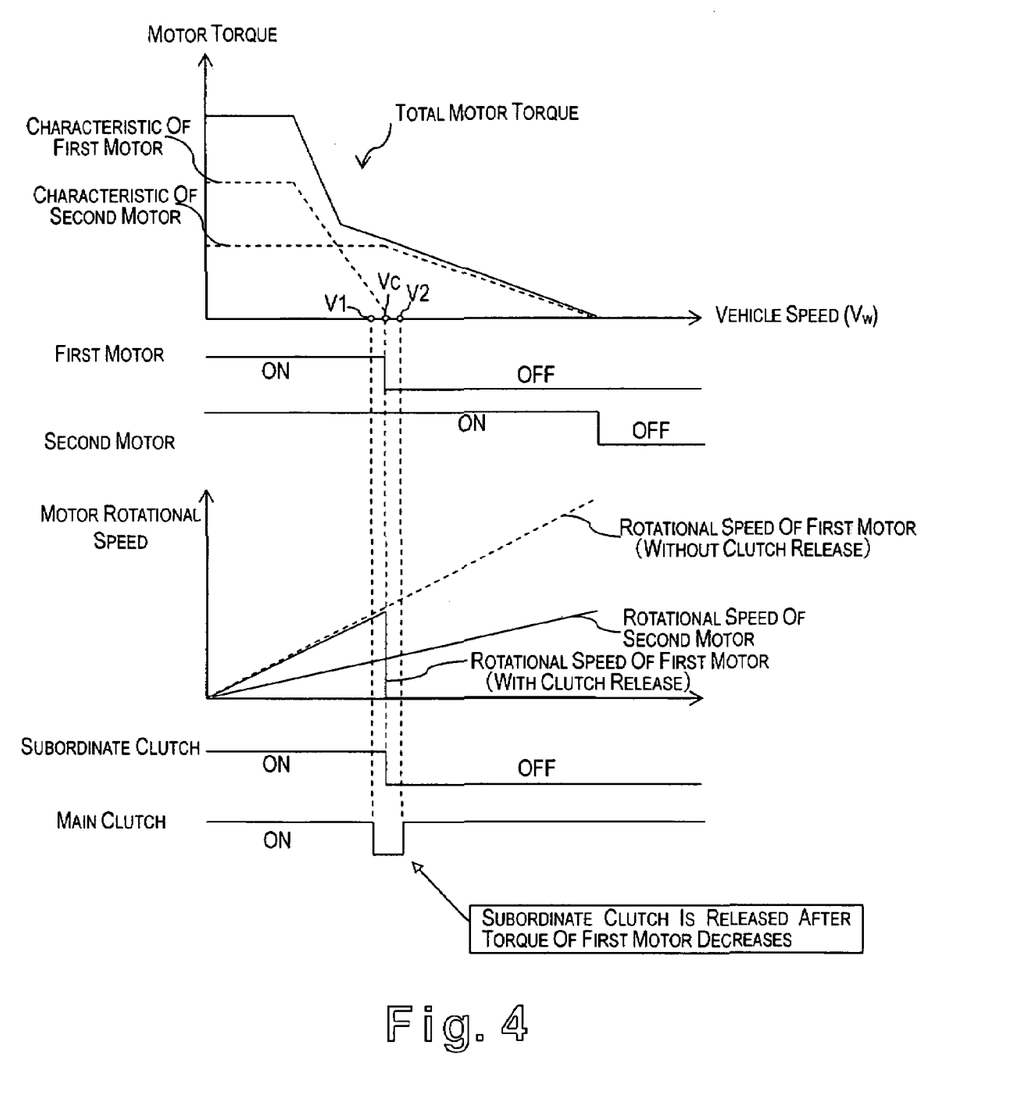
FIG. 4 is an example of a time chart for illustrating relationships between operations of the first motor, the second motor, the subordinate clutch and the main clutch and the motor torque and the motor rotational speed in accordance with an alternative embodiment of the first embodiment of the present invention.

As explained above, in the first embodiment of the present invention, only the first motor M1 is preferably run when the vehicle speed Vw is less than or equal to the prescribed changeover vehicle speed Vc. Alternatively, the vehicle drive apparatus of the present invention can be configured and arranged to control the first and second motors M1 and M2 such that both the first motor M1 and the second motor M2 are run when the vehicle speed Vw is less than or equal to the changeover vehicle speed Vc and only the second motor M2 (which provides a high rotational speed torque characteristic) is run when the vehicle speed Vw exceeds the changeover vehicle speed Vc. A time chart illustrating this alternative operation is shown in FIG. 4.

In this alternative embodiment of the present invention, the prescribed changeover vehicle speed Vc is preferably set in experimental basis to a vehicle speed at which the torque of the first motor M1 is decreased to be equal to or less than a prescribed minute torque. Accordingly, in this alternative embodiment of the present invention, the shock and abnormal noise associated with disconnecting the subordinate clutch 30 can be reduced to an even greater degree by releasing the subordinate clutch 30 when the torque acting on the first shaft 20 is almost zero.

The prescribed minute torque is preferably a torque that is small enough to keep the shock and abnormal noise associated with releasing the subordinate clutch 30 within permissible levels. Of course, the present invention can be arranged such that the subordinate clutch 30 is released when the output torque of the first motor M1 has reached zero. However, the duration of the temporary release of the main clutch 31 can be shortened by releasing the subordinate clutch 30 when the output torque reaches the prescribed minute torque but not yet zero, as explained above.

Moreover, the vehicle drive apparatus of the present invention can also be arranged to release the subordinate clutch 30 not when the output torque of the first motor M1 reaches the prescribed minute torque but when the torque on the side of the first motor M1 of the subordinate clutch 30 matches the torque on the side of the rear wheels 1R of the subordinate clutch 30. This approach, too, allows the subordinate clutch 30 to be released when the torque at the subordinate clutch 30 is small, and thus, the shock and abnormal noise associated with disconnecting the subordinate clutch 30 can be reduced.

In this alternative configuration of the vehicle drive apparatus, too, the driving of the first and second motors M1 and M2 can be controlled appropriately in accordance with the vehicle speed Vw as seen in FIG. 4. More specifically, both of the first motor M1 and the second motor M2 are preferably driven to achieve powerful acceleration when the vehicle is starting to move from a stopped condition, and only the second motor M2 is preferably driven to obtain the required torque when the vehicle is traveling at a high speed.

Also, in the first embodiment explained above, the switching between the two-wheel drive mode and the four-wheel drive mode is explained as being executed by using the drive mode switch 12. Of course, it will be apparent to those skilled in the art from this disclosure that the control executed by the motor controller 11 can be also applied to when the vehicle shifts from the two-wheel drive mode to the four-wheel drive mode automatically based on the traveling conditions of the vehicle, such as when the front wheels 1F, i.e., the main drive wheels, slip during acceleration.

Moreover, the present invention is not limited to an arrangement in which the first and second motors M1 and M2 use the battery 9 as a power source. For example, the vehicle drive apparatus of the present invention can be applied to a battery-less four-wheel drive vehicle in which a generator is connected to the engine 2. In such a case, electric power generated by the generator can be supplied the first and second motors M1 and M2.

Furthermore, the present invention is not limited to utilizing only two motors, i.e., first and second motors M1 and M2. For example, a plurality of motors, three or more motors, can be used to deliver output to the rear wheels 1R in the present invention.

Also, the first and second motors M1 and M2 are not limited to an electric motor. For example, hydraulic motors or another commonly known type of rotary drive source can be utilized as the first and second motors M1 and M2. Moreover, the first motor M1 and the second motor M2 are not limited to be the same kind of motor. For example, the first and second motors M1 and M2 can be different types of motors, e.g., one of the first and second motors M1 and M2 can be an electric motor and the other one can be a hydraulic motor.

Although in the first embodiment explained above, the motor control main unit 11C is configured to execute the control processing for the temporary release of the main clutch 31 (step S80 to step S100 of FIG. 2), it is also acceptable to have another processing unit execute this control processing.

Second Embodiment

Figure 5:
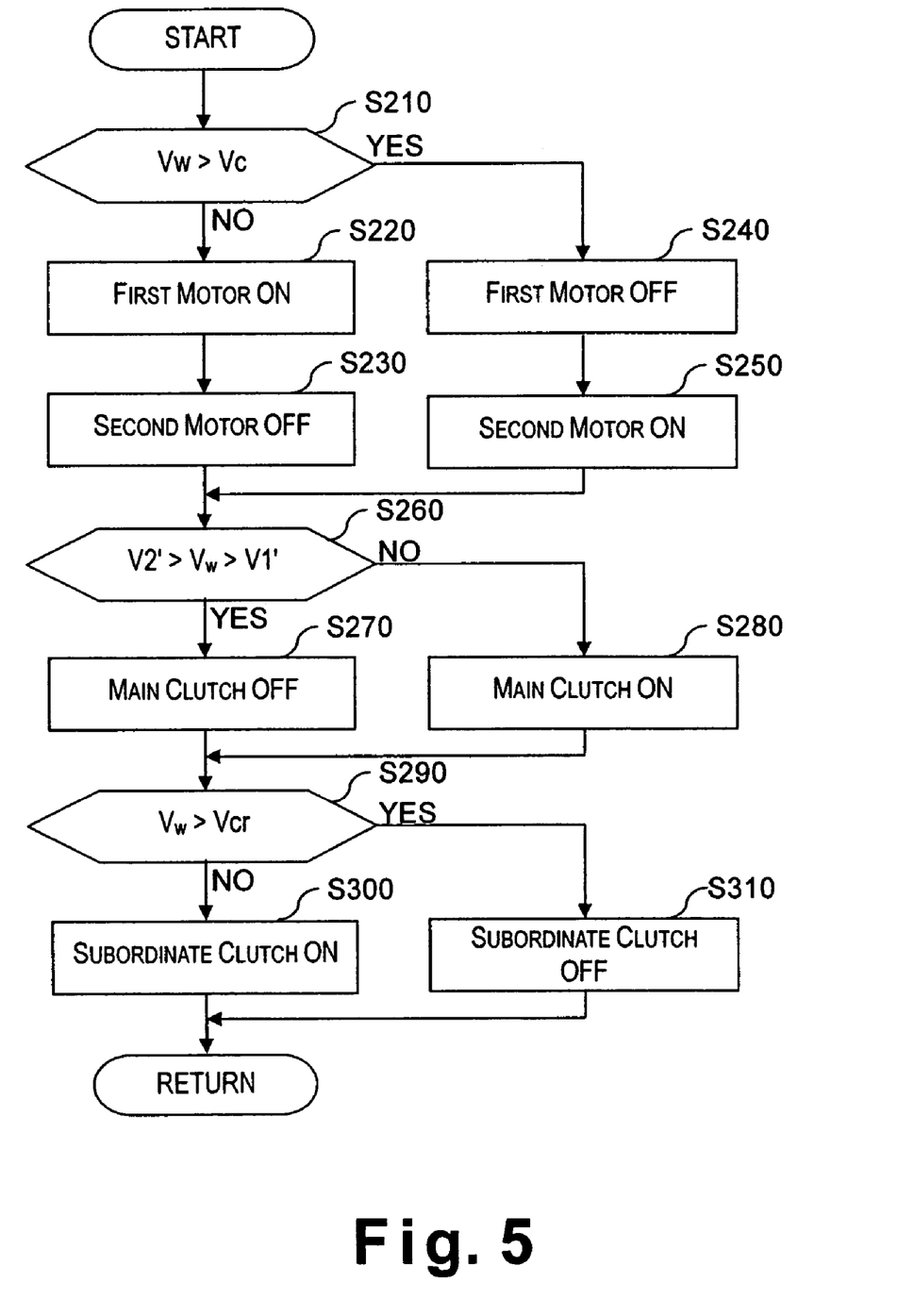
FIG. 5 is a flowchart for explaining a control processing executed by a motor controller of a vehicle drive apparatus in accordance with a second embodiment of the present invention.
Figure 6:
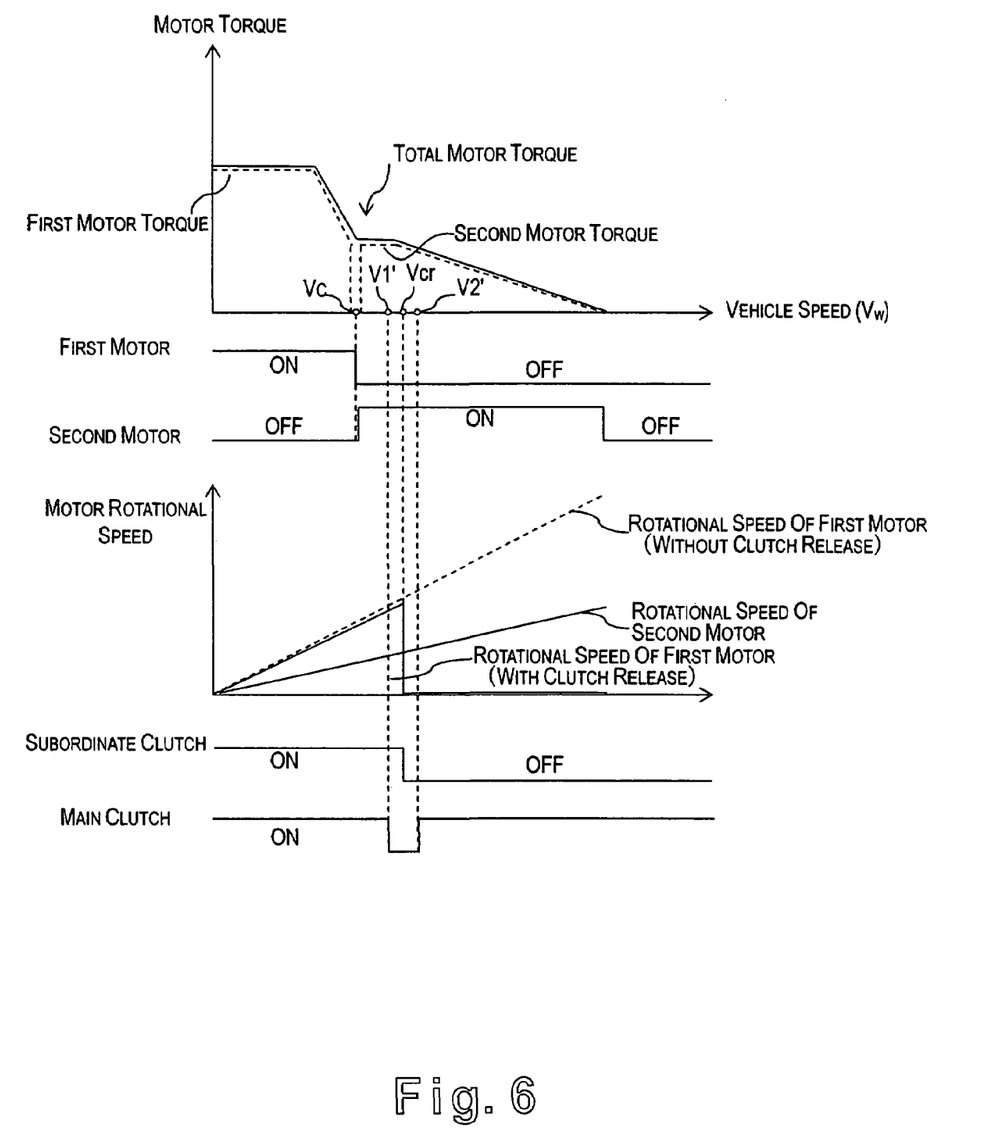
FIG. 6 is an example of a time chart for illustrating relationships between operations of the first motor, the second motor, the subordinate clutch and the main clutch and the motor torque and the motor rotational speed in accordance with the second embodiment of the present invention.

Referring now to FIGS. 5 and 6, a vehicle drive apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The basic constituent features of the vehicle drive apparatus of the second embodiment are identical to the vehicle drive apparatus of the first embodiment as shown in FIG. 1. The second embodiment of the present invention differs from the first embodiment in that the control executed in the motor control main unit 11C is slightly different from the control in the first embodiment. More specifically, in the second embodiment of the present invention, the release timing of the subordinate clutch 30 is different from the first embodiment explained above.

The control processing executed by the motor controller main unit 11C in accordance with the second embodiment will now be described with reference to a flowchart of FIG. 5.

As shown in FIG. 5, in step S210 the motor control main unit 11C is configured to determine if the current vehicle speed Vw exceeds a prescribed changeover speed Vc. If the vehicle speed Vw is equal to or less than the prescribed changeover vehicle speed Vc, then the motor control main unit 11C is configured to proceed to step S220. If the vehicle speed Vw exceeds the prescribed changeover vehicle speed Vc, the motor control main unit 11C is configured to proceed to step S240.

In step S220, the motor control main unit 11C is configured to send the ON command to the first motor control unit 11A. Then, in step S230, the motor control main unit 11C is configured to send the OFF command to the second motor control unit 11B and proceed to step S260.

On the other hand, if the motor control main unit 11C determines that the vehicle speed Vw exceeds the prescribed changeover vehicle speed Vc in step S210, the motor control main unit 11C is configured to proceed to step S240, and send the OFF command to the first motor control unit 11A. Then, in step S250, the motor control main unit 11C is configured to send the ON command to the second motor control unit 11B and proceed to step S260.

In step S260, the motor control main unit 11C is configured to determine if the vehicle speed Vw is larger than a first prescribed vehicle speed V1' and smaller than a second prescribed vehicle speed V2', i.e., if the vehicle speed Vw falls between the first and second prescribed vehicle speeds V1' and V2'. In this embodiment, the first and second prescribed vehicle speeds V1' and V2' are preferably set such that the second prescribed vehicle speed V2' is greater than a clutch release vehicle speed Vcr and the clutch release vehicle speed Vcr is greater than the first prescribed vehicle speed V1' (i.e., V1' <Vcr<V2'). The clutch release vehicle speed Vcr is preferably a vehicle speed at which the torque output of the first motor M1 has become less than a prescribed minute torque after termination of the drive input to the first motor M1. The clutch release vehicle speed Vcr is preferably determined by experimental basis or the like. The prescribed minute torque is preferably set to a value that is small enough to keep the shock and abnormal noise associated with releasing the subordinate clutch 30 within permissible levels.

If the vehicle speed Vw is between the first and second prescribed vehicle speeds V1' and V2' in step S260, then the motor control main unit 11C is configured to proceed to step S270 and send the OFF command to the main clutch 31 before proceeding to step S290. If the vehicle speed Vw is not between the first and second prescribed vehicle speeds V1' and V2', then the motor control main unit 11C is configured to proceed to step S280 and send the ON command to the main clutch 31 before proceeding to step S290.

In step S290, the motor control main unit 11C is configured to determine if the current vehicle speed Vw exceeds the clutch release vehicle speed Vcr. If the vehicle speed Vw exceeds the clutch release vehicle speed Vcr, the motor control main unit 11C determines that there is a passive torque due to a rotation of the first motor M1 equal to or exceeding a prescribed value acting on the first shaft 20. Thus, the motor control main unit 11C is configured to proceed to step S310 and send the OFF command to the subordinate clutch 30 before ending the control sequence. On the other hand, if the current vehicle speed Vw is equal to or less than the clutch release vehicle speed Vcr in step S290, the motor control main unit 11C is configured to proceed to step S300 and send the ON command to the subordinate clutch 30 before ending the control sequence.

Thus, with the vehicle drive apparatus of the second embodiment, the shock and abnormal noise associated with disconnecting the subordinate clutch 30 can be further reduced.

The operation and effects of the second embodiment will now be described with reference to FIG. 6.

As shown in FIG. 6, in the second embodiment, the motor used to deliver the output to the rear wheels 1R is switched from the low speed purpose first motor M1 to the high speed purpose second motor M2 when the vehicle speed Vw exceeds the changeover vehicle speed Vc. As the vehicle speed Vw rises and exceeds the first prescribed vehicle speed V1', the main clutch 31 is temporarily released. Then, when the vehicle speed Vw exceeds the clutch release vehicle speed Vcr, the subordinate clutch 30 is released. When the vehicle speed Vw further rises over the second prescribed vehicle speed V2', the temporarily released main clutch 31 is reengaged.

The other operational effects of the second embodiment are basically the same as those of the first embodiment.

Although in the second embodiment as explained above the motor control main unit 11C is configured to execute the control processing for releasing the main clutch 31 and the subordinate clutch 30 (steps S260 to S310 of FIG. 5), the vehicle drive apparatus of the present invention can be arranged to have another processing unit that executes this control processing.

Also, in the second embodiment the motor control main unit 11C estimates an output torque or an rotational speed of the first motor M1 based on the vehicle speed Vw. However, the invention is not limited to such an arrangement. For example, the output torque or the rotational speed of the first motor M1 can be directly measured to determine the release timing of the subordinate clutch 30 based on the measured value. Alternatively, whether the torque output of the first motor M1 has reached or fallen below the prescribed minute torque value can be estimated based on whether a prescribed amount of time has elapsed since the drive input to the first motor M1 was stopped. In either case, the timing of the temporary release of the main clutch 31 is controlled to match the timing of the release of the subordinate clutch 30.

Third Embodiment

Figure 7:
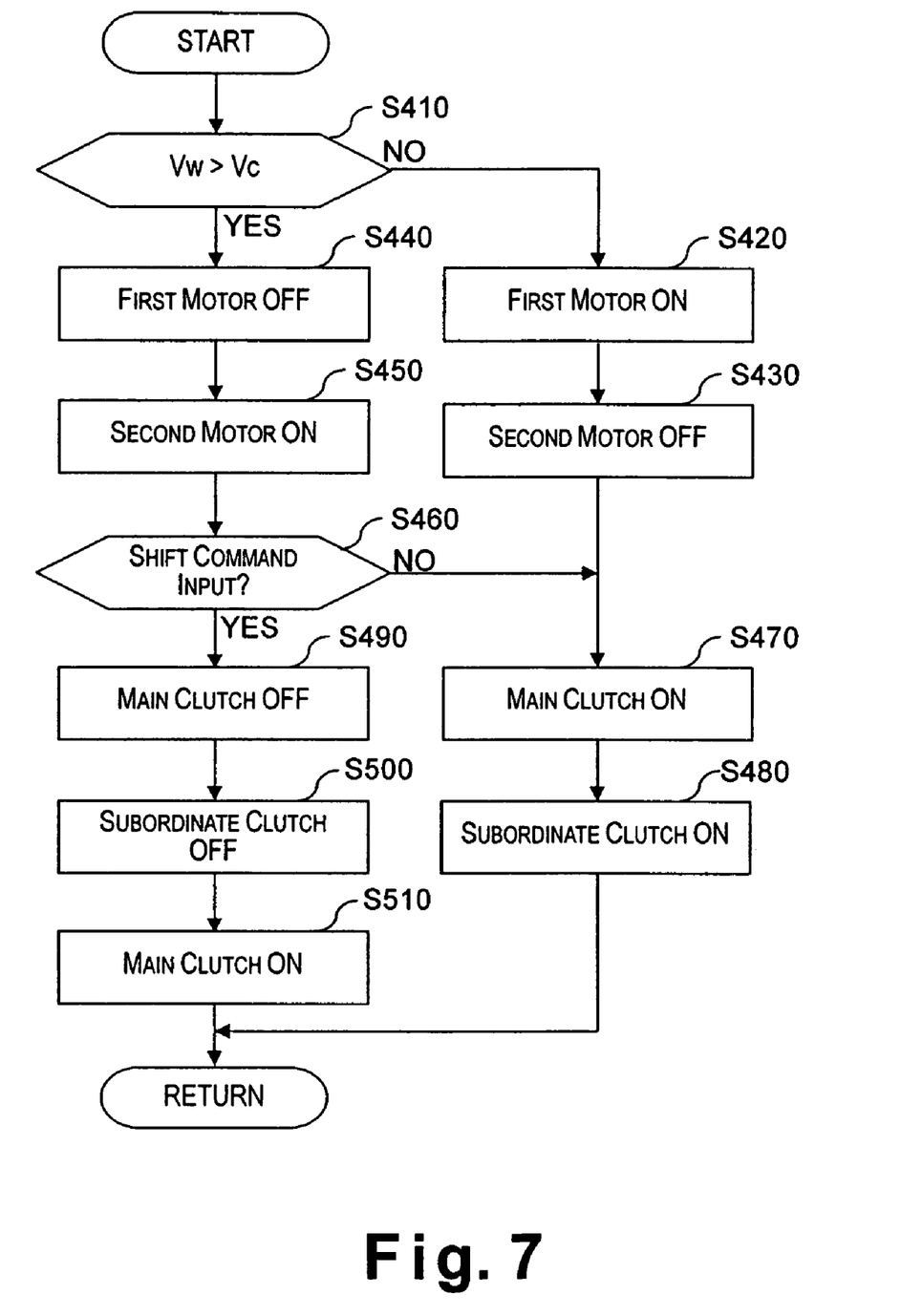
FIG. 7 is a flowchart for explaining a control processing executed by a motor controller of a vehicle drive apparatus in accordance with a third embodiment of the present invention.
Figure 8:
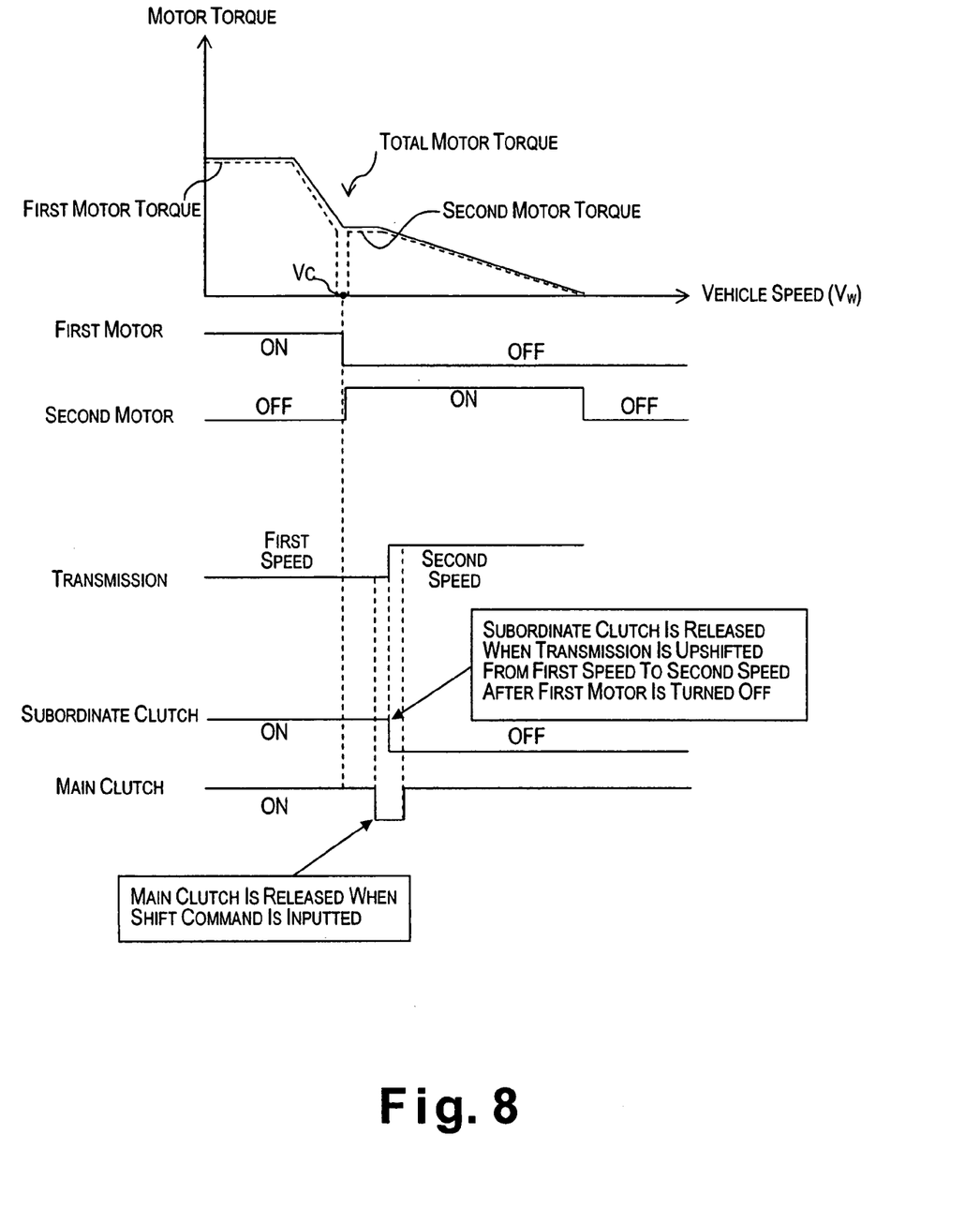
FIG. 8 is an example of a time chart for illustrating relationships between operations of the first motor, the second motor, the subordinate clutch, the main clutch and the transmission and the motor torque in accordance with the third embodiment of the present invention.

Referring now to FIGS. 7 and 8, a vehicle drive apparatus in accordance with a third embodiment will now be explained. In view of the similarity between the previous embodiments and third embodiments, the parts of the third embodiment that are identical to the parts of the previous embodiments will be given the same reference numerals as the parts of the previous embodiments. Moreover, the descriptions of the parts of the third embodiment that are identical to the parts of the previous embodiments may be omitted for the sake of brevity.

The basic constituent features of the vehicle drive apparatus of the third embodiment are identical to the vehicle drive apparatus of the first embodiment as shown in FIG. 1. The third embodiment of the present invention differs from the previous embodiments in that the control executed in the motor control main unit 11C is slightly different from the control in the previous embodiments. More specifically, in the third embodiment of the present invention, the release timing of the subordinate clutch 30 is determined based on whether a shift command is input from the transmission controller 8, such that the releasing of the subordinate clutch 30 is synchronized with the gear shifting of the transmission 3 (e.g., upshift from the first speed to the second speed).

The control processing executed by the motor control main unit 11C in accordance with the third embodiment will now be described with reference to a flowchart of FIG. 8.

As shown in FIG. 8, in step S410 the motor control main unit 11C is configured to determine if the current vehicle speed Vw exceeds a prescribed changeover speed Vc. If the vehicle speed Vw is equal to or less than the prescribed changeover vehicle speed Vc, then the motor control main unit 11C is configured to proceed to step S420. If the vehicle speed Vw exceeds the prescribed changeover vehicle speed Vc, then the motor control main unit 11C is configured to proceed to step S440.

In step S420, the motor control main unit 11C is configured to send the ON command to the first motor control unit 11A. Then, in step S430, the motor control main unit 11C is configured to send the OFF command to the second motor control unit 11B and proceed to step S470. In step S470, the motor control main unit 1C is configured to send the ON command to the main clutch 31. Then, in step S480, the motor control main unit 11C is configured to send the ON command to the subordinate clutch 30 and end the control sequence.

On the other hand, if the motor control main unit 11C determines that the vehicle speed Vw exceeds the prescribed changeover vehicle speed Vc in step S410, then the motor control main unit 11C is configured to proceed to step S440, and send the OFF command to the first motor control unit 11A. Then, in step S450, the motor control main unit 11C is configured to send the ON command to the second motor control unit 11B and proceed to step S460.

In step S460, the motor control main unit 11C is configured to determine whether a shift command is issued from the transmission controller 8 that is indicative of gear shifting of the transmission 3. Thus, the motor control main unit 11C preferably constitutes a gear change determining section. Of course, it will be apparent to those skilled in the art from this disclosure that the vehicle drive apparatus can be configured and arranged such that a separate component other than the motor control main unit 11C is provided that performs the control of step S460 to serve as the gear change determining section.

If it is determined that the shift command has been issued in step S460, then the motor control main unit 11C is configured to send the OFF command to the main clutch 31 in step S490, and then, send the OFF command to the subordinate clutch S500. After the subordinate clutch 30 is released in step S500, the motor control main unit 11C is configured to send the ON command to the main clutch 31 to reengage the main clutch 31 before ending the control sequence.

If it is determined that the shift command has not been issued in step S460, the motor control main unit 11C is configured to send the ON command to the main clutch 31 and the subordinate clutch 30 in steps S470 and S480 before ending the control sequence.

Accordingly, in the third embodiment of the present invention, the vehicle drive apparatus is configured to temporarily release the main clutch 31 and release the subordinate clutch 30 when the gear change determining section determines that the transmission is shifting gears after the drive input to the first motor M1 has been stopped.

When the transmission 3 through which the drive torque of the engine 2 is delivered to the front wheels 1F (main drive wheels) upshifts, the drive torque imparted to the front wheels 1F decreases, i.e., changes. By synchronizing the release of the subordinate clutch 30 with this change in the drive torque delivered to the front wheels 1F, the shock and abnormal noise associated with change in the torque delivered to the rear wheels 1R can be substantially hidden from notice. Moreover, in a case where the vehicle executes the four-wheel drive control in which the torque of the rear wheels 1R is controlled in accordance with the acceleration slippage of the front wheels 1F, since the front wheels 1F (main drive wheels) are less likely to slip during an upshifting operation because the drive torque imparted to the front wheels 1F decreases. In such case, the torque imparted to the rear wheels 1R does not have to be high either. Thus, by selecting the appropriate motor (i.e., the first motor M1 and/or the second motor M2) when the transmission 3 upshifts, the appropriate torque for the four-wheel drive at vehicle speeds ranging from low speeds to high speeds can be obtained in accordance with the shift state of the transmission 3.

Furthermore, although FIG. 8 illustrates the case in which the release of the subordinate clutch 30 is not synchronized with when the output torque of the first motor M1 becomes substantially small, the vehicle drive apparatus of the third embodiment can also be arranged such that the release of the subordinate clutch 30 is synchronized with the gear shifting of the transmission 3 in conjunction with releasing the subordinate clutch 30 when the output torque of the first motor M1 is small as explained in the second embodiment above. In other words, the release timing of the subordinate clutch 30 can also be synchronized with the torque becoming the minute torque after the drive input to the first motor M1 is stopped, thereby further reducing the shock and abnormal noises associated with releasing the subordinate clutch 30.

In all of the embodiments described above, the timing at which the first motor M1 is stopped is determined based on the vehicle speed Vw. However, the present invention is not limited to such arrangement. For example, the first and second motors M1 and M2 can also be controlled based on a shift command issued from the transmission controller 8, instead of the vehicle speed Vw, such that only the first motor M1 or both the first and second motors M1 and M2 are run when the transmission 3 is in the first gear (first speed) and only the second motor M2 is run when the transmission 3 is in the second gear (second speed). In other words, in such arrangement, the first motor M1 is preferably stopped when the transmission 3 shifts from first gear to the second gear.

Although the previous embodiments illustrate cases in which the transmission 3 is an automatic transmission, the transmission 3 is not limited to the automatic transmission. It will be apparent to those skilled in the art from this disclosure that the transmission 3 can be a manual transmission.

Figure 9:
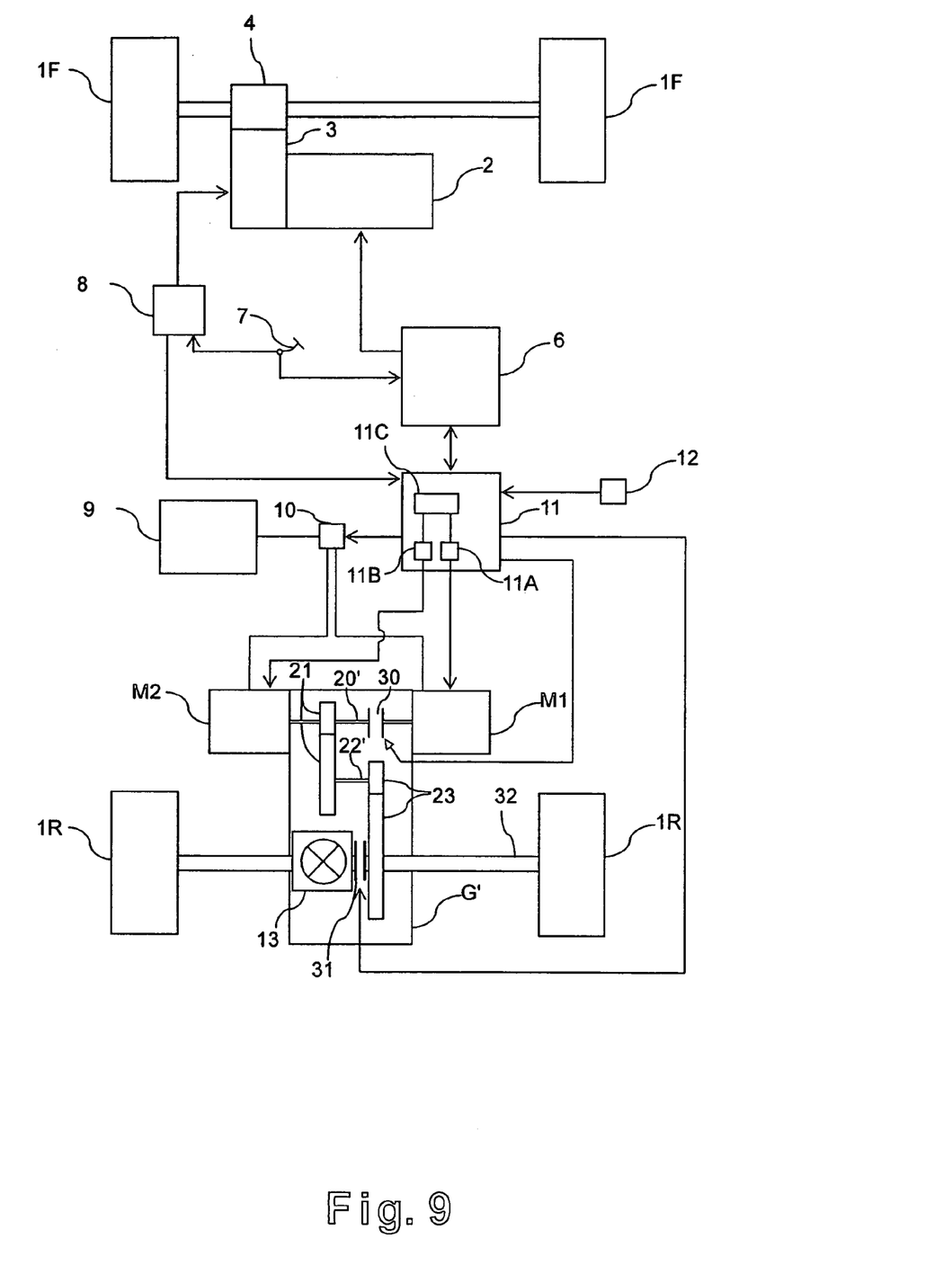
FIG. 9 is a schematic block diagram of a vehicle equipped with an alternative configuration of the vehicle drive apparatus when two motors having different torque specifications are used in accordance with the present invention.

In the above explained embodiments of the present invention, the first and second motors M1 and M2 preferably have identical specifications (i.e., have the same torque characteristic). Of course, it will be apparent to those skilled in the art from this disclosure that the first and second motors M1 and M2 can be arranged to have different torque characteristics such that the motor torque characteristics of the first and second motors M1 and M2 are generated similar to the motor torque characteristics chart in FIG. 4 discussed above. For example, FIG. 9 shows one example of a modified configuration of the vehicle drive apparatus in which the first and second motors M1 and M2 having different torque specifications are used. More specifically, the first motor M1 is preferably configured to have low rotational speed torque specifications and the second motor M2 is preferably configured to have high rotational speed torque specifications. In such case, the reduction gear G may be eliminated or have different configuration as shown in FIG. 9. As used herein, a motor that has low rotational speed torque specifications is a motor configured and arranged to output torque more readily at low rotational speeds (i.e., the peak torque value of the motor occurs at a low rotational speed, and a torque can only be generated in a low rotational speed region). Likewise, a motor that has high rotational speed torque specifications is a motor configured and arranged to output torque more readily at high rotational speeds (i.e., the peak torque value of the motor occurs at a higher rotational speed than the rotational speed at which the peak torque value of the first motor M1 occurs, and a torque can be generated is both in a low rotational speed region and in a high rotational speed region). In other words, the rotational speed region in which the torque can be generated in the second motor M2 extends to the higher rotational speed region comparing to the rotational speed region in which the torque can be generated in the first motor M1. Thus, the second motor M2 can generate torque even in the higher rotational speed region in which the first motor M1 cannot generate the torque readily.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-337881 and 2004-262461. The entire disclosures of Japanese Patent Application Nos. 2003-337881 and 2004-262461 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle drive apparatus comprising:
   first and second drive sources configured and arranged to output drive forces to at least a first wheel of a vehicle;
   a main clutch configured and arranged to simultaneously shut off delivery of outputs from the first and second drive sources to the first wheel;
   a subordinate clutch coupled to the first drive source configured and arranged to shut off delivery of only the output from the first drive source to the first wheel;
   a drive source selecting section configured and arranged to select at least one of the first and second drive sources to output the drive force to the first wheel; and
   a clutch control section configured and arranged to release the subordinate clutch while the main clutch is temporarily released upon a determination of the first drive source being switched from an output delivery state to an output stop state.

2. The vehicle drive apparatus as recited in claim 1, further comprising a reduction gear configured and arranged to couple the first and second drive sources with the first wheel such that the first drive source generates a torque at a lower vehicle speed than the second drive source.

3. The vehicle drive apparatus as recited in claim 1, wherein
the first drive source provides a first torque characteristic in which a torque is generated at a lower rotational speed than a rotational speed required in a second torque characteristic of the second drive source, and
the drive source selecting section is further configured and arranged to select at least the first drive source to deliver the output to the first wheel when a vehicle speed is equal to or less than a prescribed changeover speed, and terminate a delivery of the output of the first drive source to the first wheel when the vehicle speed exceeds the prescribed changeover speed.

4. The vehicle drive apparatus as recited in claim 1, wherein
the clutch control section is configured and arranged to determine the first drive source is switched from the output delivery state to the output stop state upon determination of driving of the first drive source being terminated.

5. The vehicle drive apparatus as recited in claim 3, wherein
the clutch control section is configured and arranged to determine the first drive source is switched from the output delivery state to the output stop state upon determination of driving of the first drive source being terminated.

6. The vehicle drive apparatus as recited in claim 1, wherein
the clutch control section is configured and arranged to determine the first drive source is switched from the output delivery state to the output stop state upon determination of an output torque of the first drive source having decreased to zero or to a torque value equal to or less than a prescribed minute torque after driving of the first drive source being terminated.

7. The vehicle drive apparatus as recited in claim 3, wherein
the clutch control section is configured and arranged to determine the first drive source is switched from the output delivery state to the output stop state upon determination of an output torque of the first drive source having decreased to zero or to a torque value equal to or less than a prescribed minute torque after driving of the first drive source being terminated.

8. The vehicle drive apparatus as recited in claim 1, further comprising
a third drive source configured and arranged to drive at least a second wheel of the vehicle; and
a transmission installed in a power transmission path between the third drive source and the second wheel.

9. The vehicle drive apparatus as recited in claim 8, wherein
the clutch control section is further configured and arranged to release the subordinate clutch in synchronization with the transmission changing gears in accordance with a determination by a gear change determining section that is configured and arranged to determine a gear change in the transmission.

10. The vehicle drive apparatus as recited in claim 3, further comprising
a third drive source configured and arranged to drive at least second wheel of the vehicle; and
a transmission installed in a power transmission path between the third drive source and the second wheel.

11. The vehicle drive apparatus as recited in claim 10, wherein
the clutch control section is further configured and arranged to release the subordinate clutch in synchronization with the transmission changing gears in accordance with a determination by a gear change determining section that is configured and arranged to determine a gear change in the transmission.

12. The vehicle drive apparatus as recited in claim 6, further comprising
a third drive source configured and arranged to drive at least second wheel of the vehicle; and
a transmission installed in a power transmission path between the third drive source and the second wheel.

13. The vehicle drive apparatus as recited in claim 12, wherein
the clutch control section is further configured and arranged to release the subordinate clutch in synchronization with the transmission changing gears in accordance with a determination by a gear change determining section that is configured and arranged to determine a gear change in the transmission.

14. The vehicle drive apparatus as recited in claim 1, wherein
the first and second drive sources are motors.

15. The vehicle drive apparatus as recited in claim 8, wherein
the first and second drive sources are motors.

16. The vehicle drive apparatus as recited in claim 15, wherein
the third drive source is an internal combustion engine.

17. A vehicle drive apparatus comprising:
first and second drive means for outputting drive forces to at least a first wheel of a vehicle;
main clutch means for simultaneously shutting off delivery of outputs from the first and second drive sources to the first wheel;
subordinate clutch means for shutting off delivery of only the output from the first drive means to the first wheel;
drive source selecting means for selecting at least one of the first and second drive means to output the drive force to the first wheel; and
clutch control means for releasing the subordinate clutch means while the main clutch means is temporality released upon a determination of the first drive means being switched from an output delivery state to an output stop state.

18. A vehicle driving method comprising:
selectively providing first and second drive sources for outputting drive forces to at least first wheel of a vehicle;
selecting at least one of the first and second drive sources to output the drive force to the first wheel based on a prescribed operating state; and
shutting off a first torque delivery path from the first drive source to the first wheel while temporarily shutting off a second torque delivery path from the first and second drive sources to the first wheel upon determination of the first drive source being switched from an output delivery state to an output stop state.

* * * * *